United States Patent
Bertolotti et al.

(10) Patent No.: US 11,923,915 B2
(45) Date of Patent: Mar. 5, 2024

(54) CONVERTOR BETWEEN CONTROL VOLTAGES AND SUPPLY VOLTAGES

(71) Applicant: SKY ITALIA S.r.l., Milan (IT)

(72) Inventors: Massimo Bertolotti, Milan (IT); Claudio Zammarchi, Milan (IT)

(73) Assignee: SKY ITALIA S.r.l., Milan (IT)

( * ) Notice: Subject to any disclaimer, the term of this patent is extended or adjusted under 35 U.S.C. 154(b) by 120 days.

(21) Appl. No.: 17/680,650

(22) Filed: Feb. 25, 2022

(65) Prior Publication Data

US 2022/0271656 A1 Aug. 25, 2022

(30) Foreign Application Priority Data

Feb. 25, 2021 (IT) .................. 102021000004424

(51) Int. Cl.
*H02M 3/04* (2006.01)
*H04B 3/54* (2006.01)
*H04N 21/426* (2011.01)

(52) U.S. Cl.
CPC ............ *H04B 3/548* (2013.01); *H02M 3/04* (2013.01); *H04B 2203/547* (2013.01); *H04N 21/426* (2013.01)

(58) Field of Classification Search
None
See application file for complete search history.

(56) References Cited

U.S. PATENT DOCUMENTS 7,184,428 B1 * 2/2007 Gerszberg ........... H04L 12/2898
370/465

FOREIGN PATENT DOCUMENTS

| EP | 3 457 579 A1 | 3/2019 |
|---|---|---|
| ES | 2 589 632 A1 | 11/2016 |
| WO | WO 2020/171202 A1 | 8/2020 |

OTHER PUBLICATIONS

Search Report for Italian Application No. 202100004424, dated Nov. 1, 2021.
[No Author Listed] 5G Outdoor CPE Installation Manual, Document Version 1.0. Samsung Electronics Co., Ltd. Feb. 2019:1-67.
[No Author Listed] Cat 6 Cable, High Reliability Cat 6 Cable & Cordset. Amphenol. Aug. 2013:42.
(Continued)

*Primary Examiner* — Jeffery S Zweizig
(74) *Attorney, Agent, or Firm* — Wolf, Greenfield & Sacks, P.C.

(57) ABSTRACT

A voltage conversion apparatus for converting from a control voltage to a supply voltage and an apparatus for converting from a supply voltage to a control voltage are described. The supply voltage is designed to power, through a coaxial cable, a data communication device, and the coaxial cable is suitable for transmitting said supply voltage signal and at least one data signal associated with said data communication device. A conversion means of the conversion apparatus is configured to convert from the control voltage to the supply voltage comprising conversion means configured to convert from a first value of control voltage Vp1 and from a second value of control voltage Vp2 to a first value of supply voltage Va1 and, respectively, to a second value of supply voltage Va2. Said first value of control voltage Vp1 and said second value of control voltage Vp2 are values of control voltage for controlling a device that is distinct from such a data communication device.

14 Claims, 8 Drawing Sheets

(56) References Cited

OTHER PUBLICATIONS

[No Author Listed] Digital Satellite Equipment Control (DiSEqC™), Update and Recommendations for Implementation Version 2.1. Eutelsat. Feb. 25, 1998:1-42.

[No Author Listed] Fiber-to-the Distribution Point & Home Networking, MDU-4640 & GCA-6010 FTTdp DPU & CPE. Comtrend. Apr. 2019:1-2.

[No Author Listed] Series G: Transmission Systems and Media, Degital Systems and Networks. Unified high-speed wireline-based home networking transceivers—Data Link Layer Specification. International Telecommunication Union—Telecommunication Standardization Sector of ITU. Recommendation ITU-T G.9961. Nov. 2018:1-410.

[No Author Listed] Series G: Transmission Systems and Media, Degital Systems and Networks. Unified high-speed wire-line based home networking transceivers—System architecture and physical layer specification Corrigendum 1. International Telecommunication Union—Telecommunication Standardization Sector of ITU. Recommendation ITU-T G.9960. Originally dated 2018; updated Sep. 2019:1-150.

[No Author Listed] Technical Specification H-399A AL PVC, Rev. MI 322-10. Micro TEK S.r.l. Aug. 20, 2013:1-4.

\* cited by examiner

CONVERTOR BETWEEN CONTROL VOLTAGES AND SUPPLY VOLTAGES

CROSS REFERENCE TO RELATED APPLICATIONS

The present disclosure claims priority to Italian Patent Application No. 102021000004424, titled "CONVERTOR BETWEEN CONTROL VOLTAGES AND SUPPLY VOLTAGES," filed Feb. 25, 2021, which is hereby incorporated by reference in its entirety.

FIELD OF THE INVENTION

The present disclosure relates to a voltage conversion apparatus for converting from a control voltage to a supply voltage. The present disclosure further relates to a voltage conversion apparatus for converting from a supply voltage to a control voltage.

The supply voltage can be designed to power, through a coaxial cable, a data communication device. The control voltage can be a voltage for controlling a distinct device from the data communication device, in particular comprising a setting device.

BACKGROUND OF THE INVENTION

Figure 1A:
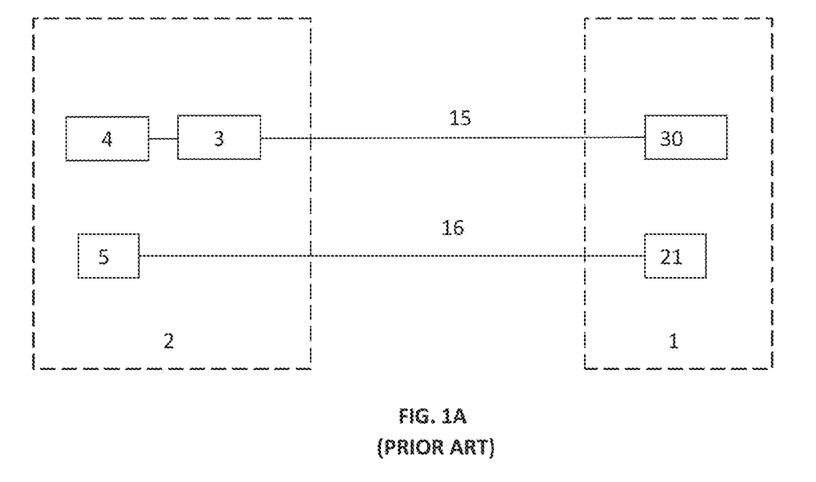
FIG. 1A Schematically illustrates a communication system for the reception of television and internet services according to the prior art.

Communication systems for the reception and enjoyment by users of television services and internet services in residential units are known in the art. These services are generally offered by sending television signals and internet signals which can include digital terrestrial signals, satellite signals and/or data signals (internet) to receivers for residential units (antennas, receivers or generally devices for receiving signals). With reference to FIG. 1A, such receivers are generally placed on an external side 1 with respect to the residential unit, for example on the roof of the residential unit, on the roof of the building in which the residential unit is comprised, on a balcony of the residential unit, etc.

The signal received by the receivers must be transported from the external side to the user side, i.e., inside the residential unit, or to a part near thereto (user side 2). This allows the user to enjoy the service offered through specific user devices (for example, televisions 4 and internet routers 5). The transport from the external side to the user side can occur by means of coaxial cable 15 for satellite television signals (for example the cable H-399° described in [1]) and by connection via an ethernet cable 16 for data signals (internet). FIG. 1A schematically illustrates this type of configuration.

The signal reception apparatus can comprise, for example, 5G-FWA (fixed wireless access) internet antennas 21, or satellite dishes containing low-noise devices 30. The satellite signal received can also be decoded by means of devices for receiving and decoding satellite television signals, for example STB 3 (Set Top Box) apparatuses connected to the television 4.

The 5G FWA receiver (for example the SFG-D1100 5G Outdoor CPE described in [2]) is configured to connect with the 5G network and process the signal for example according to Rel. 16 3GPP (and/or subsequent Rel.). It is provided with an ethernet interface, for example, according to the 802.3 standard with which it connects to the user's distribution system to provide the internet connection and at the same time obtain the power necessary for its operation using, for example, the 802.3at standard (Power over Ethernet, PoE). Furthermore, the 5G FWA receiver 21 is generally connected to a further device called a media converter 20 also located near the external side. Such a media converter (external media converter) is configured to modulate the data received from the 5G FWA and to transmit it towards the user side. The external media converter is also configured to communicate with a second media converter located at the user side (user media converter). For example, MDU 4640 (master media converter for the external side) and GCA 6010 (slave media converter for the user side) are known in the art, see also [7].

This embodiment therefore requires the installation of an ethernet connection cable 16 (type CAT5 or CAT6, see [3]), and additionally a coaxial cable 15, between the roof and the user's home as shown in FIG. 1A.

The known art therefore involves managing the transmission of television services by means of coaxial cable and separately the remote power supply of the 5G FWA receiver through an ethernet connection between the external side and the user side (PoE).

SUMMARY OF THE INVENTION

An object of the present disclosure is to improve the prior art, for example overcome, or at least mitigate, at least one of the problems present in the prior art. This object is reached in accordance with the teachings of the independent claims. The dependent claims also present other further advantageous embodiments.

In particular, one of the objects of the present disclosure is to solve the problem of remotely powering (also referred to as remote powering hereinafter) apparatuses, for example apparatuses with DiSEqC™ standard management, for example DiSEqC™ 1.0 or 2.0.

In fact, power supply is often not available in attics and even when available, it is not easy to access. There are no known solutions in the art to simultaneously power the external side apparatuses, such as the 5G FWA receiver and/or the media converter connected thereto, allowing to also control devices distinct therefrom, such as the low noise device of the satellite antenna 30.

A further object of the present disclosure is to reduce installation times and ensure maximum flexibility in the use of the services by being easily scalable even in steps following the first installation.

In addition, another object of the present disclosure is to provide an access system which efficiently utilizes existing coaxial cables, ensuring the use of different services.

In greater detail, in accordance with a first aspect of the present disclosure, a voltage conversion apparatus 10 for converting from a control voltage to a supply voltage is described. The supply voltage is designed to power, through a coaxial cable 15, a data communication device 20, and the coaxial cable is suitable for transmitting said supply voltage signal and at least one data signal associated with said data communication device 20. The conversion apparatus 10 of the present disclosure comprising conversion means 11 configured to convert from a first value of control voltage Vp1 and from a second value of control voltage Vp2 to a first value of supply voltage Va1 and, respectively, to a second value of supply voltage Va2. Said first value of control voltage Vp1 and said second value of control voltage Vp2 are values of control voltage for controlling a device 30 that is distinct from such a data communication device 20.

Advantageously, in accordance with the first aspect of the present disclosure, it is possible to remotely power the apparatuses of the external side while simultaneously managing a further device, for example the LNB of the satellite dish by means of DiSEqC™ standard, generating the voltage value as a function of the control voltage.

According to a variant of the first aspect of the present disclosure, the apparatus preferably includes input means 12 configured to receive the first value of control voltage Vp1 and the second value of control voltage Vp2, preferably from a device for receiving and decoding satellite television signals 3. The apparatus preferably further includes output means 13 configured to supply the first value of supply voltage Va1 and the second value of supply voltage Va2 to the coaxial cable at the first value of control voltage Vp1 and, respectively, said second value of control voltage Vp2.

In accordance with a second aspect of the present disclosure, an apparatus 110 for converting voltage for converting from a supply voltage to a control voltage is described. The supply voltage is provided through a coaxial cable and is designed to power, through the coaxial cable 15, a data communication device 20. The coaxial cable 15 is suitable for transmitting the supply voltage signal and at least one data signal associated with said data communication device 20. The apparatus 110 comprising conversion means 111 configured to convert from a first value of supply voltage Va1 and from a second value of supply voltage Va2, to a first value of control voltage Vp1 and, respectively, to a second value of control voltage Vp2. The first value of control voltage Vp1 and the second value of control voltage Vp2 are values of control voltage for controlling a device distinct 30 from such a communication device 20.

Advantageously, the second aspect of the present disclosure allows to remotely power the apparatuses of the external side while simultaneously managing a further device generating a control value as a function of the supply value.

In accordance with a variation of the second aspect of the present disclosure, the conversion apparatus comprises first output means 113a for supplying said supply voltage to said data communication device 20, and second output means 113b for supplying said values of control voltage to said distinct device 30 from said data communication device 20.

Advantageously, in accordance with this variation of the second aspect of the disclosure, it is possible to separate (or even decouple) the supply voltage Va from the control voltage Vp, thus allowing the remote powering of the data communication device 20 and at the same time the management of the distinct device 30. In accordance with another variation of the first aspect or the second aspect of the disclosure, the first value of supply voltage Va1 and the second value of supply voltage Va2 can be comprised in a range of operating voltages of said data communication device 20. In accordance with another variation of the first aspect or the second aspect of the disclosure, at least one of said first value of control voltage Vp1 and said second value of control voltage Vp2 is excluded from said range of operating voltages. This makes it possible to improve the management of the distinct device 30 and the data communication device 20 even when the range in which the control voltage of the distinct device 30 is comprised and the range in which the supply voltage of the data communication device 20 is comprised are not overlapping or cannot be overlapped, in other words the management is improved even when the two ranges are incompatible.

In accordance with another variation of the first aspect or the second aspect of the disclosure, the distinct device 30 is configured to control a communication channel over the coaxial cable. In this case, the first value of control voltage and the second value of control voltage are arranged to control the distinct device 30 by controlling said communication channel of the distinct device 30, preferably by opening or closing said communication channel over the coaxial cable. According to this aspect of the disclosure it is possible to manage the distinct device 30 in accordance with the DiSEqC™ protocol.

In accordance with another variation of the first aspect or the second aspect of the disclosure, the range of operating voltages comprises a range of voltages for which the data communication device 20 functions in a substantially independent manner and/or in a manner that is substantially uninfluential with respect to a voltage value comprised in such a range.

In accordance with this aspect, it is possible to control the distinct device 30 so as not to affect the remote powering of the data communication device 20.

According to a third aspect of the present disclosure, a system is described comprising: the apparatus according to the first aspect of the disclosure which can also be referred to as an internal apparatus, the apparatus of the second aspect of the disclosure, which can also be referred to as an external apparatus and a coaxial cable connecting the external apparatus and the internal apparatus.

According to a variation of the third aspect of the present disclosure, the output means of the external apparatus is configured to supply values of control voltage Vp1, Vp2 that are substantially equal to the values of control voltage Vp1, Vp2 received from the input means of the internal apparatus.

In accordance with the third aspect of the disclosure, it is possible to further improve the control of the distinct device 30 and the remote powering of the data communication device 20 by jointly using the external apparatus and the internal apparatus.

DETAILED DESCRIPTION OF THE EMBODIMENTS

The prior art involves the use of an ethernet connection between the user side and the external side for powering the external data communication devices (e.g., media converter 20 and 5G FWA) providing Internet services.

One of the objects of the present disclosure is to enable the operation of the communication system even in the absence of an ethernet connection 16 (for example by cable), for example if it is not possible or not desired.

In this case, an advantageous solution comprises using the coaxial cable 15 of the satellite system connecting the user side with a setting device (or also a configuration device) such as the low-noise device 30 of the satellite dish located at the external side. Such a low-noise device 30 is also known by the acronym LNB, Low Noise Block, and is controllable, for example, according to the DiSEqC™ 2.0 standard and the other versions of such a communication protocol, see [4].

One of the merits of the inventors lies in having recognised that the coaxial cable 15 can be used for both the data transfer of at least one data communication device, and for the power supply of such device through the Power over Coaxial (PoC, provided herein as a non-limiting example) technique in addition to performing the functions associated with the management of the satellite system (including both the transmission of satellite signals and the control of the LNB).

Another merit of the inventors lies in having recognised that the data communication device, for example the 5G FWA 21, is substantially transparent to (i.e., works in a substantially indifferent manner or without being substantially influenced by) the value of the supply voltage provided as long as it falls within a certain operating range. In addition, the data communication device, for example the media converter 20, can be made substantially transparent to the value of the supply voltage provided through the use, for example, of a DC-DC converter.

Therefore, one of the ideas underlying the present disclosure is to convert, upstream, two control values into two voltage values within the range of operating voltages. Thereby, the downstream data communication device continues to function in a substantially undisturbed manner, and—restoring the control voltages downstream of the coaxial cable—it is at the same time possible to control a downstream setting device such as the LNB 30 of the satellite dish.

Other objects and advantages of the present disclosure will be further appreciated and understood by the person skilled in the art, for example when considered in conjunction with the following description and the accompanying drawings. While the following description can contain specific details describing particular embodiments of the disclosure, this is not to be construed as limitations to the scope of the disclosure, but rather as an example of preferable embodiments.

For each aspect of the disclosure, many variants are possible as suggested herein which are known to those of ordinary skill in the art. Various variations and modifications can be made within the scope of the invention without departing from the teachings and spirit thereof.

Figure 1B:
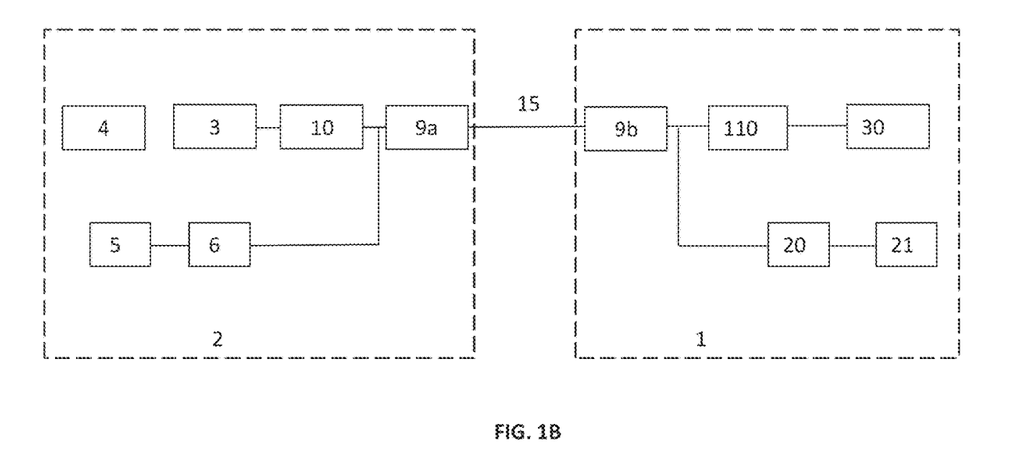
FIG. 1B schematically illustrates the communication system for the reception and enjoyment of television services and the internet in accordance with the present disclosure.
Figure 4:
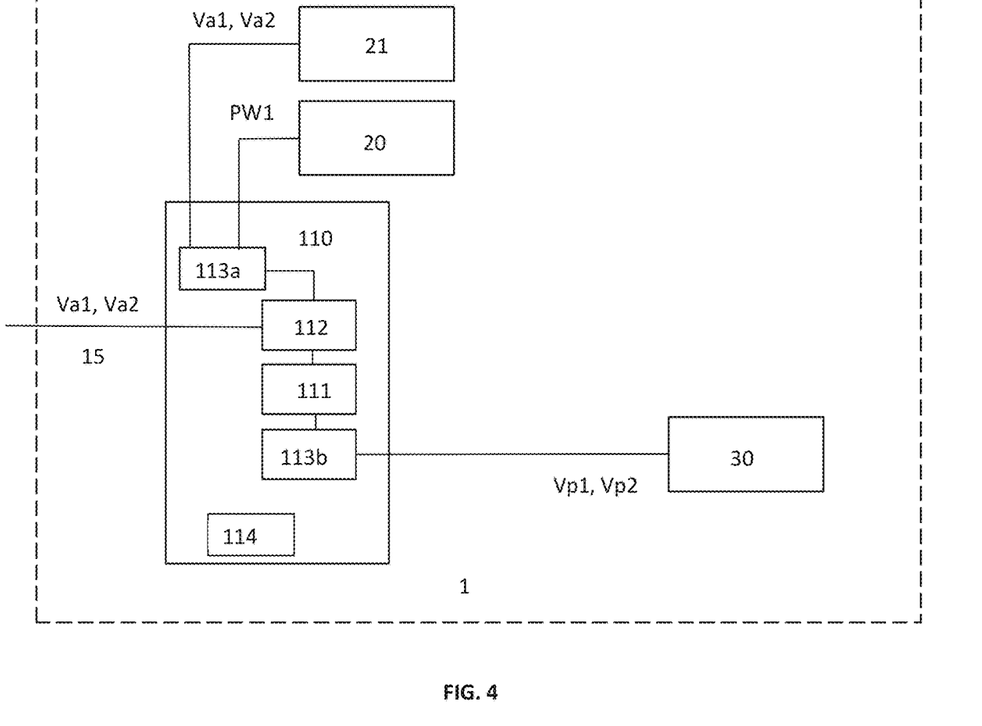
FIG. 4 schematically illustrates a voltage conversion apparatus for converting from a supply voltage to a control voltage according to an embodiment of the present disclosure.

With reference to FIG. 1B, a system according to an embodiment will now be described, in which the examples of devices and interconnections are illustrative and not limiting. Further examples of interconnections according to particular embodiments to which the present disclosure is not limited are shown schematically by FIG. 8 and FIG. 9, respectively. In FIG. 1B, the 5G FWA receiver 21, the media converter 20 connected thereto and the LNB 30 are connected to the same coaxial cable 15. FIG. 1B shows for the sake of simplicity a serial connection of the 5G FWA receiver 21 to the media converter 20. However, as also illustrated in FIG. 4, other types of connection between the 5G FWA receiver 21 and the media converter 20 are possible. Furthermore, according to some embodiments the media converter 20 can be optional.

In FIG. 1B, the coaxial cable 15 connects the external side 1 with the user side 2 to allow the enjoyment of the television service and the Internet service through the respective user terminals. Examples of such user terminals are the television 4 or the router 5 connected to the media converter 6 of the user side. User-side devices can generally be powered using the power supply available in the residential unit, while external-side devices are powered by PoCs. For example, the 5G FWA receiver 21 can be connected to a PoE coupling unit (not shown in the figure) connected to the coaxial cable 15. Such a PoE coupling unit allows to convert the power received on the coaxial cable 15 through the PoC standard into power according to the PoE standard to power the 5G FWA receiver 21. The PoE coupling unit, for example when connected to the 5G FWA receiver 21 or when connected (optionally through DC/DC converter) to the media converter 20, can also be considered a data communication device.

The PoC supply technique can involve the use of a power injector 9a located at the user side. Such a power injector can supply, for example through an AC/DC adapter, two distinct supply voltages. A first voltage PW1=12V to power the internal media converter 6 and a second voltage PW2=55V injected on the coaxial cable 15 to power, through such a coaxial cable 15, the external-side data communication devices. The first voltage PW1 and the second voltage PW2 can also be referred to as Vpi, or also as Vai, where i=1 or 2, terminology used hereinafter, see FIG. 3 and FIG. 5.

On the external side, for example by means of a power extractor 9b, it is possible to extract the direct voltage PW2 and send it for example to a DC-DC adapter (not shown in the figure) configured to power the external media converter with the direct voltage PW1.

By means of PoE ethernet coupling according to the 802.3at standard, the voltage PW2 powers the 5G-FWA receiver through the ethernet interface.

Furthermore, the voltage conversion apparatus 10 and the voltage conversion apparatus 110 simultaneously allow the LNB of the satellite dish to be controlled. Such apparatuses will be described hereinafter with reference to FIG. 2 and FIG. 4, respectively. In summary, the conversion apparatus 10 is configured to couple a given value of supply voltage to a given value of control voltage. The conversion apparatus 110 is configured to perform the opposite procedure, by decoupling the value of supply voltage from the value of control voltage. The conversion apparatus 110 is further configured to control the LNB 30 with the value of control voltage and to power the data communication device through the value of supply voltage. Therefore, the two apparatuses jointly insert and extract the supply voltage associated with the control signal on and from the coaxial cable, allowing the LNB to be controlled and the data communication device to be remotely powered.

Figure 2:
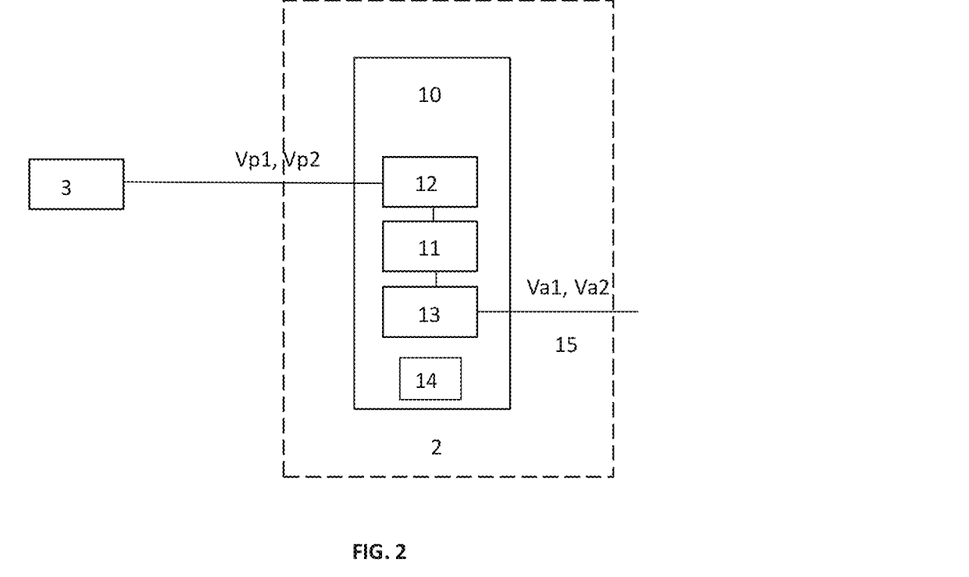
FIG. 2 schematically illustrates a voltage conversion apparatus for converting from a control voltage to a supply voltage according to an embodiment of the present disclosure.

FIG. 2 schematically illustrates a first embodiment of the present disclosure. In particular, FIG. 2 shows a voltage conversion apparatus 10 for converting from a control voltage Vp1, Vp2 to a supply voltage Va1, Va2 and including conversion means 11.

Such a conversion means 11 can be configured to convert from a first value of control voltage Vp1 and from a second value of control voltage Vp2 to a first value of supply voltage Va1 and, respectively, to a second value of supply voltage Va2. Value of control voltage means a voltage value suitable for supplying or driving, e.g. controlling, a setting device, and therefore, represents for example a voltage value for transmitting the power necessary for the operation of the setting device. Setting device means a device which, when supplied with a certain power (or supply voltage), is capable of changing the configuration (or the setting(s)) of one or more of its components. Alternatively or in addition, setting device means a device which is capable of changing the setting of one or more of its components or of one or more components connected thereto based on the voltage value of an input signal or based on a voltage difference of the input signal. An example of a setting device is represented by the LNB. Examples of settings are further described in [4], which describes the DiSEqC™ standard. More generally, the control voltage can be defined as a supply voltage of a first device (for example, an LNB) further providing information on how to operate such a first device or a component thereof. The supply voltage is the supply voltage of a second device (for example a data communication device) other than the first device; reference will be made to control voltage and, respectively, supply voltage in order to illustrate having a distinction between the two.

The apparatus 10 can further optionally include output means 13 and input means 12 and can be arranged at the user side 2.

The input means 12 can be configured to receive the first value of control voltage Vp1 and the second value of control voltage Vp2. Such control voltages can be received by a device for receiving and decoding satellite television signals, such as the STB 3.

The control voltage Vp1, Vp2 can be suitable for controlling the LNB of the satellite dish while the supply voltage Va1, Va2 can be designed to power the data communication device through the coaxial cable 15. Such a coaxial cable 15 is suitable for transmitting the supply voltage signal and at least one data signal associated with said data communication device. For example, the coaxial cable is designed to transmit data signals in the 2 Mhz to 150 Mhz frequency range as described hereinafter.

Figure 3:
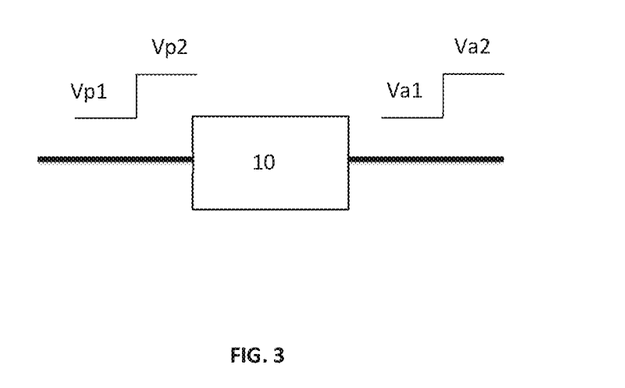
FIG. 3 schematically illustrates the voltage conversion of the embodiment of FIG. 2.

In other words, as also illustrated in FIG. 3, if the conversion means 11 receives the first value of control voltage Vp1 in input, it can produce the first value of supply voltage Va1 in output. Furthermore, if the conversion means 11 receives the second value of control voltage Vp2 in input, it can produce the first value of supply voltage Va2 in output.

The first value of supply voltage Va1 and the second value of supply voltage Va2 can be comprised in a range of operating voltages of the data communication device. Such values can for example be comprised in a range of operating voltages of the 5G FWA receiver 21 and/or the media converter 20 (and/or the PoE coupling unit). Such a range can for example comprise a sub-range of voltages for which at least one of the data communication devices functions substantially independently and/or in a manner that is substantially uninfluential with respect to a voltage value comprised in such a range. Furthermore, the first value of control voltage Vp1 and the second value of control voltage Vp2 can be values of control voltage for controlling the LNB 30 of the satellite dish.

At least one of the first value of control voltage Vp1 and the second value of control voltage Vp2 can be excluded from the range of operating voltages.

The output means 13 can be configured to supply the first value of supply voltage Va1 and the second value of supply voltage Va2 to the coaxial cable 15 at said first value of control voltage Vp1 and, respectively, the second value of control voltage Vp2.

The LNB 30 of the satellite dish can be controlled by at least two different values of control voltage. In the example of two values of control voltage, the first value of control voltage can enable the LNB 30, (i.e., enable the setting thereof) and the second value of control voltage can disable (i.e., disable the setting thereof) the LNB 30. Enabling and disabling the LNB 30 can indicate that the LNB 30 must listen to a second signal or must end listening to said second signal. In addition, the LNB 30 can be configured to control a communication channel over the coaxial cable. In this case, the first value of control voltage Vp1 and the second value of control voltage Vp2 can be such as to control the LNB by controlling said communication channel, for example by opening or closing said communication channel over the coaxial cable 15. Opening or closing the communication channel is another example of enabling and disabling the LNB 30. According to a particular embodiment, the LNB 30 can be controlled based on the difference between the first value of control voltage Vp1 and the second value of control voltage Vp2 regardless of the specific value of the first value of control voltage Vp1 and regardless of the specific value of the second value of control voltage Vp2. According to another particular embodiment, the communication channel could be a tone having a central frequency around 22 Khz. Similarly, the communication channel could comprise or consist of a band of frequencies comprised, or essentially comprised, between 0 and 22 Khz.

The conversion means 11 can obtain the supply voltage starting from the control voltage by means of a configurable association as shown in FIG. 3. Such an association (for example static, known, default, (pre)-configured) can describe a one-to-one correspondence between a given input value and the corresponding output value. The static association can be pre-configured and can be stored in storage means 14 of the conversion apparatus 10. For example, the association can be configured or modified by an installer or by a user or during a step of installation of the conversion apparatus.

According to a particular embodiment, the first value of control voltage Vp1 can be 12V and the second value of control voltage Vp2 can be 18V. Furthermore, the first value of supply voltage Va1 can be 48V and the second value of supply voltage Va2 can be 55V. This embodiment is particularly advantageous as the DiSEqC™ standard uses a direct voltage between 12V and 18V (for example 13V or 17V) and a 22 kHz tone to power and manage the LNB installed on the dish.

However, external data communication apparatuses can require voltages greater than 18V to be powered. For example, they can require voltages of 48V or 55V, higher voltages, such as 60V, are also possible. Furthermore, it is not convenient or even feasible to transmit voltages between 12V and 18V over the coaxial cable in consideration, for example, of the voltage losses which would occur along the cable. In fact, in view of the electrical resistance of the cable and the required power, a voltage between 12V and 18V is not sufficient to properly power the devices located on the external side 1, without resulting in unacceptable losses which could also damage the coaxial cable, for example due to the Joule effect. This is caused by the need to use relatively high currents along the cable to compensate for the low voltage injected by the user side 2 so as to supply the necessary power to the devices of the external side 1. On the other hand, the use of a higher voltage along the cable, for example between 48V and 55V, allows to use relatively low currents and therefore to reduce the losses along the cable. Therefore, this embodiment allows to meet the requirements of the DiSEqC™ 2.0 standard while ensuring the appropriate power supply of the external data communication device.

FIG. 4 schematically illustrates a second embodiment of the present disclosure.

As will be apparent to the person skilled in the art, the conversion apparatus 110 of the second embodiment can be configured to perform specular operations on the conversion device 10 of the first embodiment, unless otherwise indicated. Thus, a redundant description of the conversion apparatus 110 has been omitted and emphasis has instead been placed on the differences between two apparatuses.

In particular, FIG. 4 shows a voltage conversion apparatus 110 for converting from the supply voltage Va1, Va2 to the control voltage Vp1, Vp2.

The supply voltage is supplied to the voltage conversion apparatus 110 through the coaxial cable 15 and is designed to power the data communication device 20 through such a coaxial cable 15. Similar to what is described in relation to the first embodiment, the coaxial cable 15 of the second embodiment is suitable for transmitting the supply voltage signal and at least one data signal associated with the data communication device 20. The voltage conversion apparatus 110 comprises conversion means 111 and can optionally comprise storage means 114. Such conversion means 111 can be configured to convert from the first value of supply voltage Va1 and from the second value of supply voltage Va2, to the first value of control voltage Vp1 and, respectively, to the second value of control voltage Vp2. The first value of supply voltage Va1 and the second value of supply voltage Va2 are comprised in a range of operating voltages of said data communication device. Furthermore, the first value of control voltage Vp1 and the second value of control voltage Vp2 are values of control voltage for controlling the LNB 30. The storage means 114 can store the static association.

The voltage conversion apparatus 110 of the second embodiment can further comprise first output means 113a and second output means 113b and optionally input means 112. Such input means 112 can be configured to receive the input value of supply voltage Va1, Va2 provided by the coaxial cable 15 and to transmit it to the conversion means 111.

The second output means 113b can be configured to output the values of control voltage Vp1 and Vp2 to the LNB 30.

The first output means 113a can be configured to provide the values of supply voltage Va1 and Va2 to at least one data communication device, for example to the 5G FWA. Such first output means 113a is optional in that the data communication device can be configured to receive the values of supply voltage directly from the coaxial cable 15, for example through the PoE coupling unit not included in the first output means 113a. The first output means 113a can be configured to extract a voltage value of the coaxial cable from the coaxial cable and to provide an output voltage value to the data communication device based on the voltage value of the extracted coaxial cable. The voltage value of the coaxial cable and the output voltage value can be substantially the same. Alternatively, the voltage value of the coaxial cable and the output voltage value can be different. The first output means 113a can comprise for example a DC/DC converter, in this case the voltage of the coaxial cable can be extracted from the coaxial cable 15 through a power extractor and sent to the DC/DC converter which in turn powers the media converter 20.

For example, the first output means 113a can be capable of supplying the voltage value PW1 to the media converter. In addition, the first output means can be configured to provide the first and second value of supply voltage Va1, Va2 to the 5G FWA receiver. For example, the first output means 113a can include a PoE coupling unit.

Figure 5:
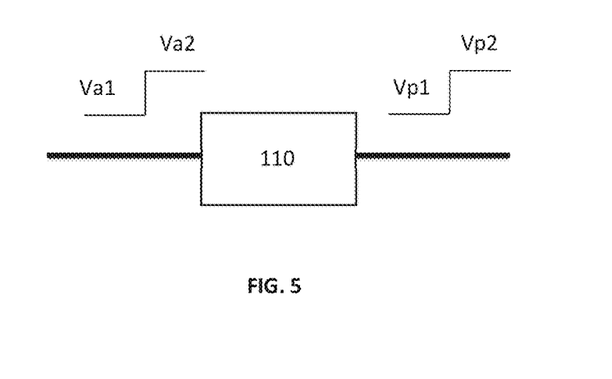
FIG. 5 schematically illustrates the voltage conversion of the embodiment of FIG. 4.

Furthermore, as illustrated in FIG. 5, if the conversion means 111 receives the first value of supply voltage Va1 from the input means 112 it can produce the first value of control voltage Vp1 in output. Furthermore, if the conversion means 111 receives the second value of supply voltage Va2 in input it can produce the first value of control voltage Vp2 in output.

The second output means 113b of the conversion apparatus 110 (external apparatus) can be configured to provide values of control voltage Vp1, Vp2 in output that are substantially equal to the values of control voltage Vp1, Vp2 received by the input means 12 of the conversion apparatus (internal apparatus). For example, the second output means can use the static association stored in the storage means 114.

In the configuration described, the coaxial cable 15 can be used to transmit different television and internet services. For example, digital terrestrial signals (according to the DVB-T2 standard in Italy), satellite signals (according to the DVB-S standard in Italy) and data signals (internet) can transit over the coaxial cable. Additional services, other than those described here, are also possible. The distribution of the transiting frequencies in the coaxial cable is dictated by the usage standards which can vary according to the geographical location of the system in view of the regulatory requirements. For example, in Italy the frequencies for satellite signals can be comprised between 950 and 2150 Mhz, while the frequencies for digital terrestrial signals can be comprised between 174 Mhz and 230 Mhz and 470 and 790 Mhz.

The simultaneous transmission of signals for different services in the coaxial cable can be obtained by dividing the available frequency spectrum into different frequency bands. For example, by means of sub carrier multiplexer technology, or SCM. The frequency bands not assigned to DVB-T (example of the first service) and DVB-S (example of the second service) can be assigned to digital signals (internet signals, for example from 5G FWA, example of the third service). In accordance with the example described above, the frequency band comprised between 2 Mhz and 150 Mhz could be reserved for internet services, as it is not assigned to the first or second service. It is thereby possible for signals related to the different services to pass over the same coaxial cable.

Furthermore, it can be advantageous to reserve a range of control frequencies. For example, the range comprised between 0 and 2 Mhz and including the 22 Khz tone advantageous for controlling the LNB of the reception dish according to the DiSEcC 2.0 standard, see for example [4]. Similarly, it could be advantageous to reserve frequency ranges as guard ranges.

Therefore, the spectrum of usable frequencies can be determined according to the geographical location of the system (for example in view of the regulatory requirements, which in Italy can also vary as a function of the region) as a function of the services offered to the end user (for example some services may not be available for a given user or not desired by the user), and as a function of any frequency bands that it is advantageous to reserve.

In other words, the frequency bands are not necessarily statically configured bands but can be dynamically defined according to the geographical location, the services offered and any frequency bands to be used for other purposes. For example, if some services are not necessary for a given user, it is possible to extend the frequency band available for the internet signal.

Figure 7:
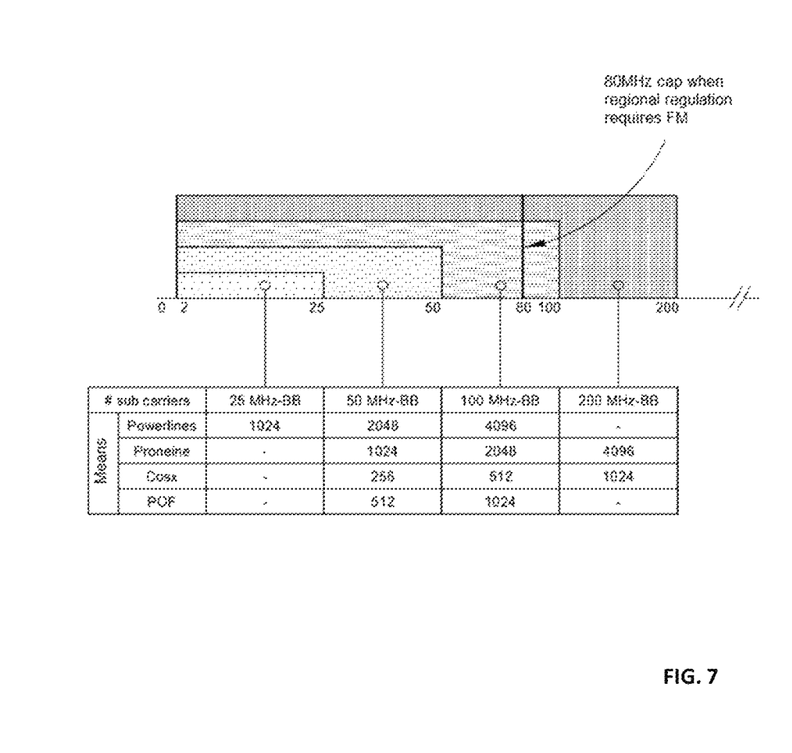
FIG. 7 schematically illustrates a conversion methodology according to recommendation ITU-T G.9960, G.9961.

Once the frequency spectrum usable for data transmission through the 5G-FWA receiver (range comprised between 2 Mhz and 172 Mhz, in the example described above) has been established, it is possible to convert the data flow through the ethernet interface of the 5G-FWA receiver into an interface compatible with the coaxial cable and the available frequency spectrum. For example, such a conversion can be carried out according to the methodology described by the recommendation ITU-T G.9960, G.9961 (see also [5] and [6], Gigabit home network or Ghn). The Ghn reports the usable frequencies and the type of transmission protocol. Such a conversion methodology is schematically illustrated in FIG. 7.

Figure 6:
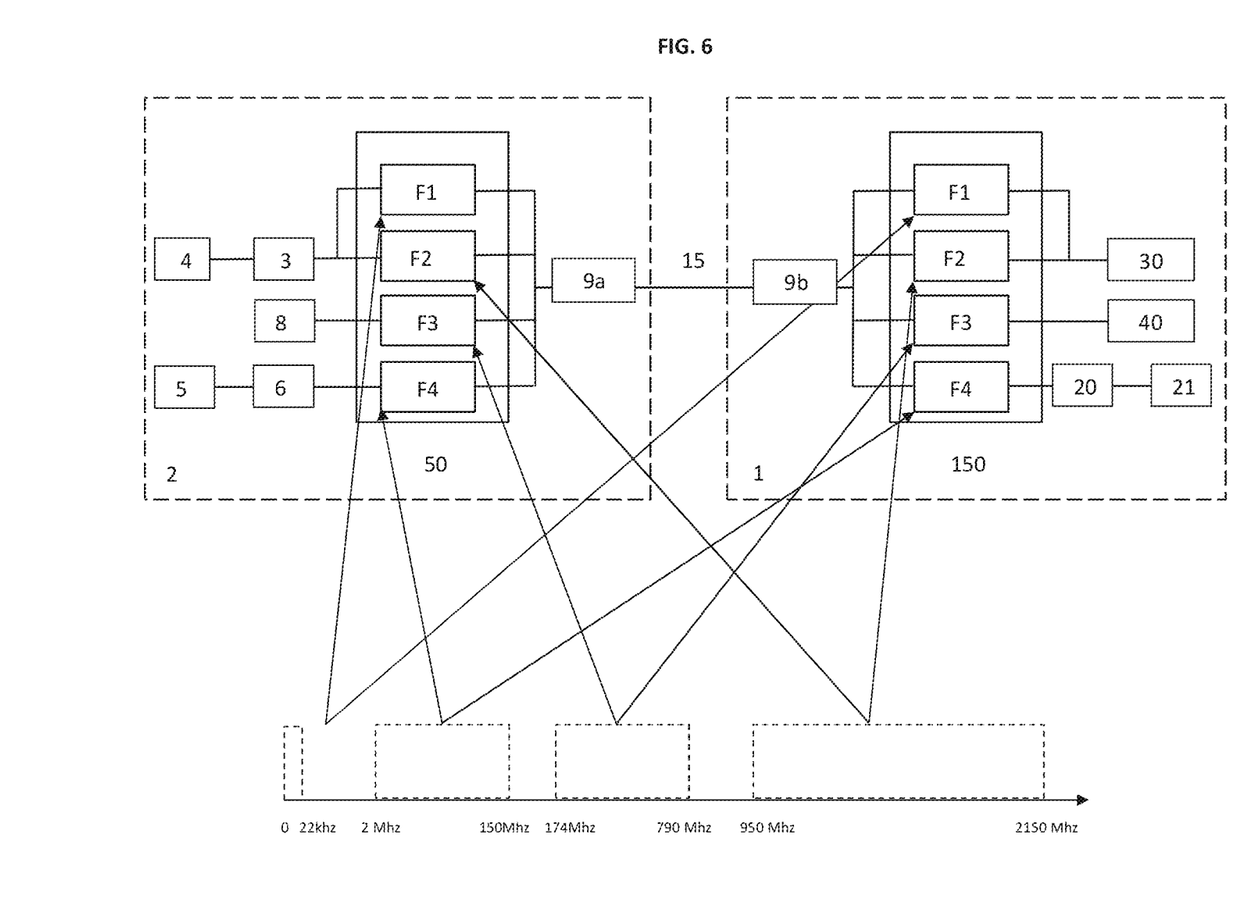
FIG. 6 schematically illustrates a filtering device in accordance with an aspect of the present disclosure.

The various signals related to the various television and internet services can be inserted on (or extracted from) the coaxial cable using an appropriate combination of frequency filters. For example, it is possible to use bandpass filters, low pass filters, or high pass filters. In accordance with a particular aspect of the present disclosure, a filtering device including three bandpass filters can be used. A first filter F2 can be configured to filter a first band (relative to satellite signals and comprised for example between 950 and 2150 Mhz). A second filter F3 can be configured to filter a second band (relative to digital terrestrial signals and comprised for example between 174 Mhz and 790 Mhz or between 174 and 230 Mhz and 470 and 790 Mhz). The DVB-T2 digital terrestrial service can be receivable through a digital terrestrial antenna 40 and can be usable by the user through a user terminal for digital terrestrial 8. Finally, a third filter F4 can be configured to filter a third band (relative to the data signals coming from the 5G-FWA receiver and comprised for example between 2 Mhz and 150 Mhz). Furthermore, the filtering device can also include a low pass filter, F1 configured to filter the tone at 22 Khz.

An example of such a filtering device is illustrated in FIG. 6 in connection with the user side 2 or with the external side 1. Such a FIG. 6 also shows the allocation of the frequency bands over the coaxial cable in accordance with the particular example described.

The configuration of the filters is not limited to that described above and the filtering device can also include filters configured to filter respectively partially overlapping frequency ranges to take into account the non-static nature of the frequency bands associable with the various services.

To correctly manage the communication between the external side and the user side, a first filtering device 50 and a second filtering device 150 having the same configuration as the filters can be used. The first filtering device can be connected between the coaxial cable 15 and the various user terminals and can further be connected between the various user terminals and the power injector 9a. Therefore, the first filtering device can be situated at the user side. The second filtering device can be connected between the coaxial cable 15 and the various receivers and the power extractor and can further be connected between the various user terminals and the power extractor 9b. Therefore, the second filtering device can be situated at the external side.

Such a configuration of the first filtering device 50, of the second filtering device 150 of the injector 9a and of the extractor 9b makes it possible to ensure the correct remote powering distance through the PoC technique which would otherwise not be easily achievable. In fact, for example, the first filtering device prevents the passage of the direct voltage, and it is therefore advantageous to perform the power injection step downstream of the filtering.

Figure 8:
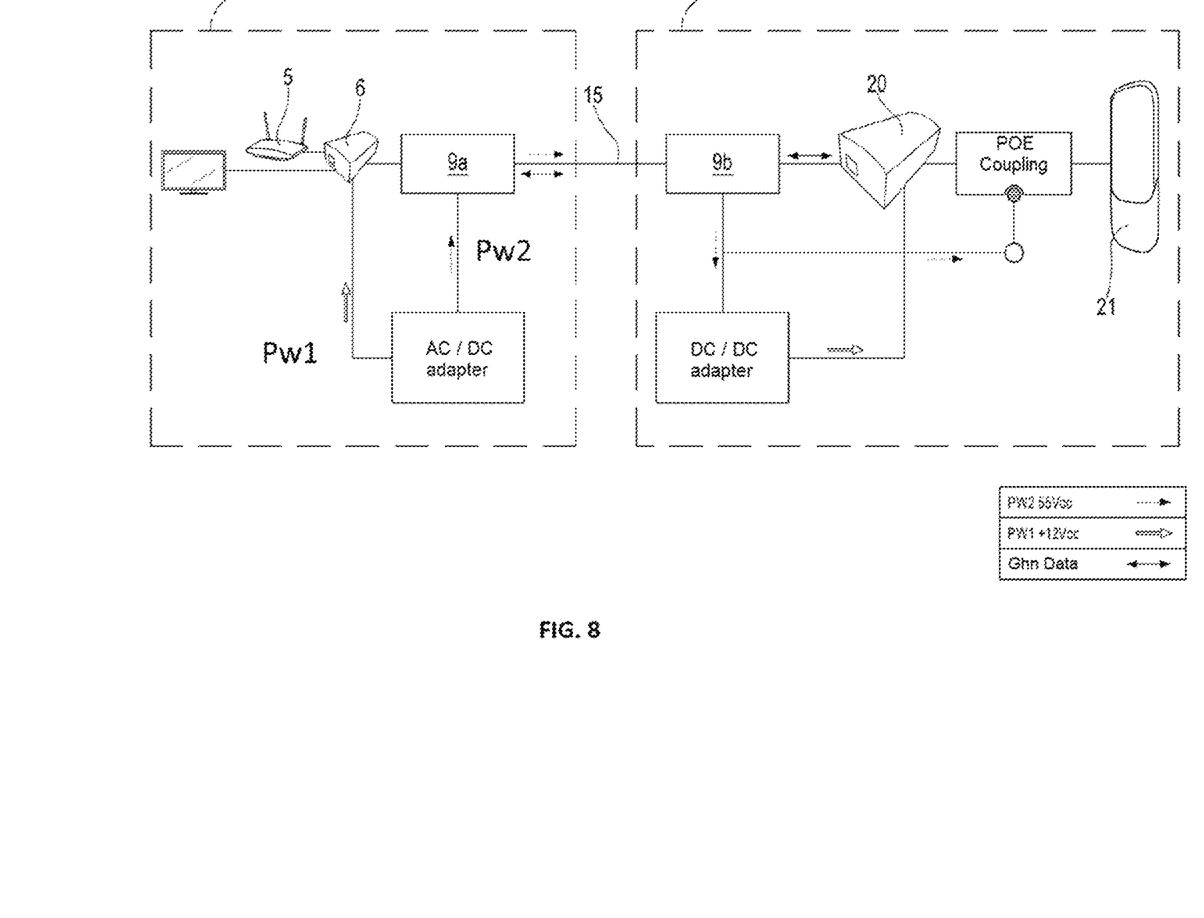
FIG. 8 schematically illustrates a communication system in accordance with an embodiment of the present disclosure.
Figure 9:
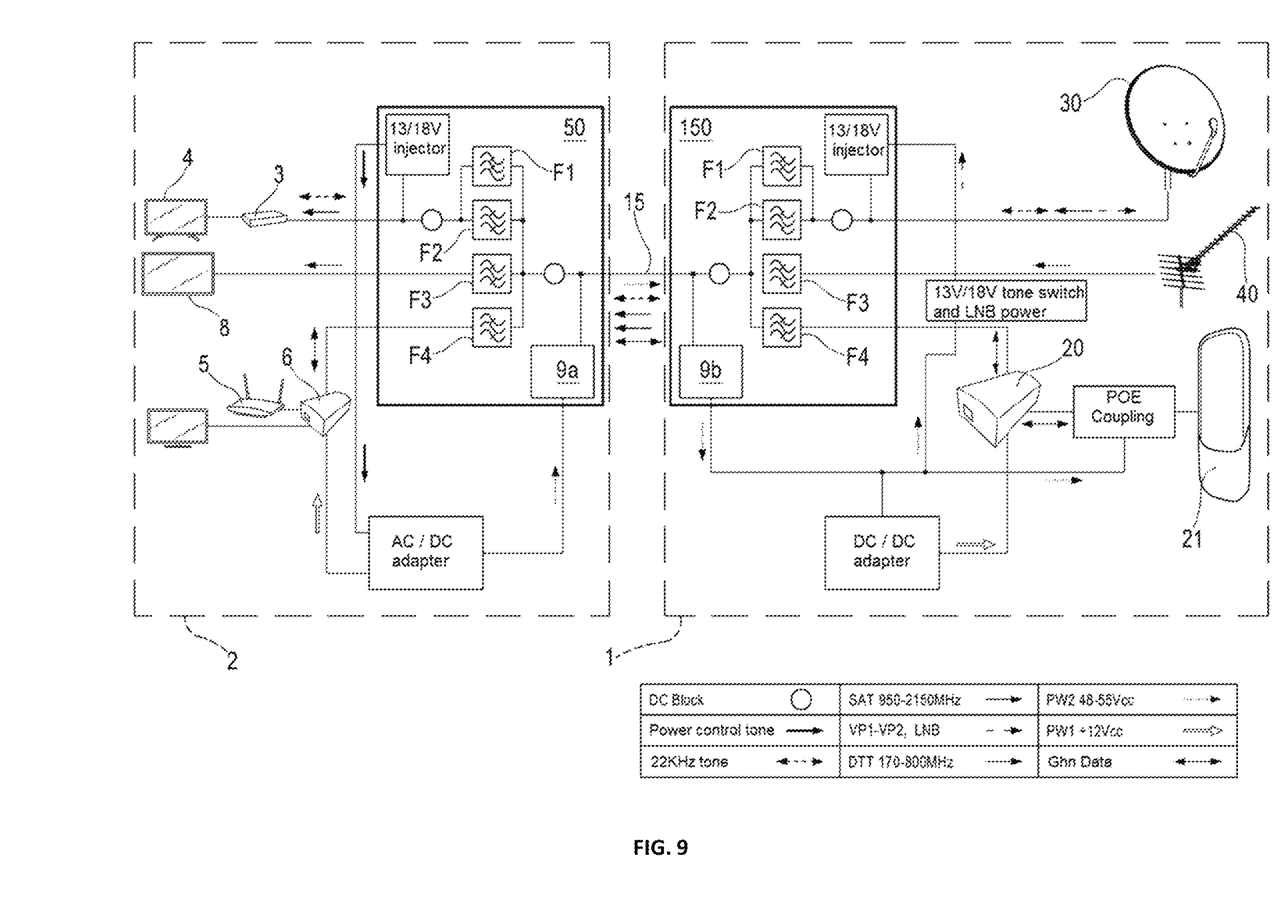
FIG. 9 schematically illustrates a communication system in accordance with an embodiment of the present disclosure.

FIG. 8 schematically illustrates a communication system in accordance with an embodiment of the present disclosure. Furthermore, FIG. 8 shows a schematic representation of the data flow and the flow of supply voltages and control voltages. FIG. 9 depicts a further embodiment in accordance with the present disclosure and shows a further schematic representation of the data flow and the flow of supply voltages and control voltages. FIG. 9 further includes, by way of example, direct current blocking devices (or also DC blocks). For example, the figure shows a DC block on the user side 2 and a DC block on the external side 1. Advantageously, the blocking devices are arranged so as to ensure the unidirectionality of the supply and control voltages in the circuit. For example, the user-side DC block has the function of preventing the supply inserted downstream of the filtering device of the user side 2 from conflicting with the voltage generated by the STB.

Figure 10:
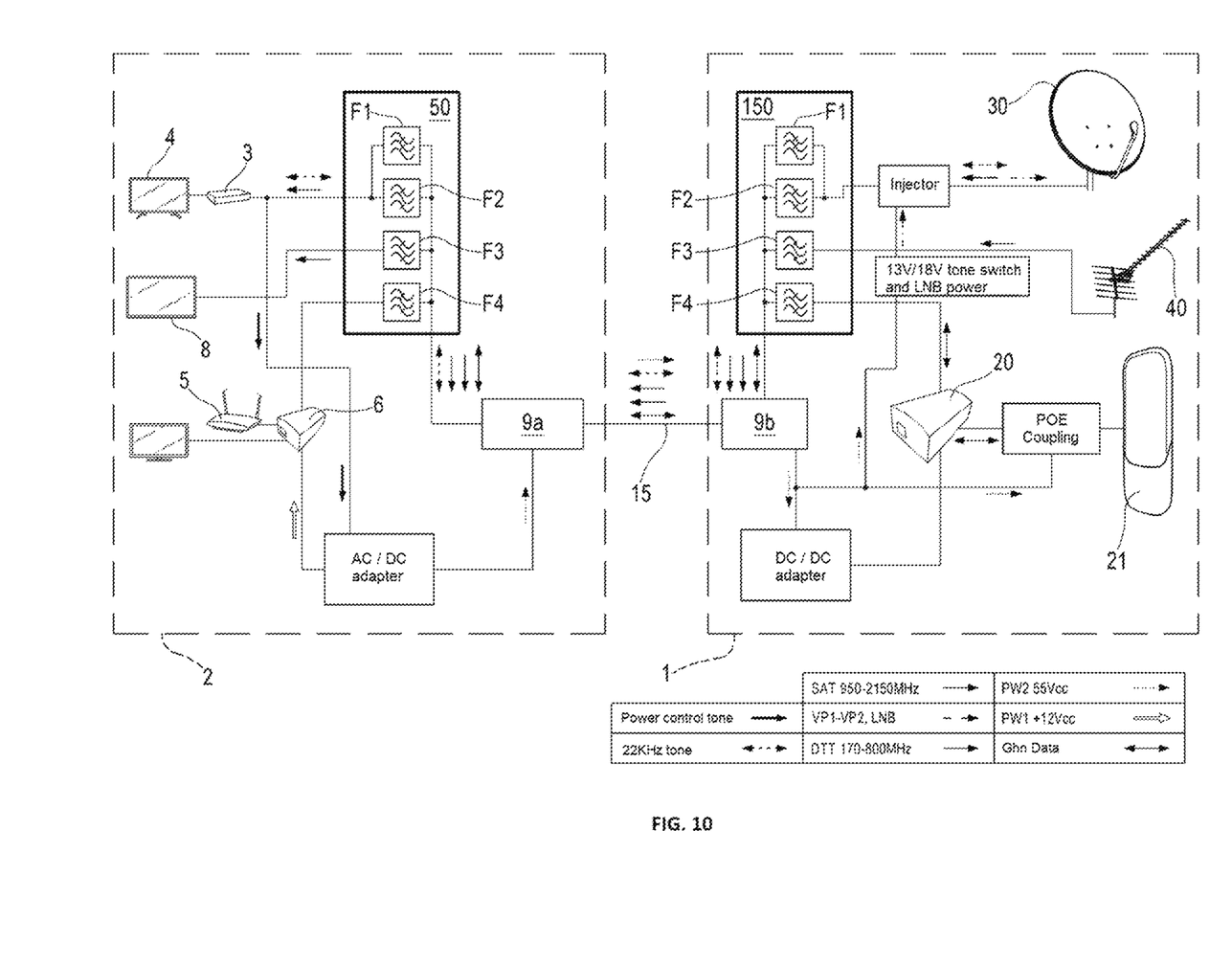
FIG. 10 schematically illustrates a communication system in accordance with another embodiment of the present disclosure.

The power injector on the user side 2 is configured to extract the supply voltage of the STB 3 (for example 12 V, or 13 V or 18 V) and to send it to the AC/DC adapter which performs the functions described above. In other words, the power injector receives the voltage change and transmits it to the AC/DC adapter. The power injector can for example be a simple inductance and be bidirectional. The AC/DC adapter can in turn be connected with the power injector 9a for the injection of voltages over coaxial cable (for example PW2=55V). FIG. 10 depicts a further embodiment in accordance with the present disclosure and shows a further schematic representation of the data flow and the flow of supply voltages and control voltages. The embodiment of FIG. 10 is distinguished from the embodiment of FIG. 9 for example in the arrangement of the injector 9a and the extractor 9b not included in the filtering device.

Variations of the Embodiment Described

In the present description reference has been made to the LNB 30 of the dish as an example of a device that is distinct from the data communication device 20. However, it will be apparent to a person skilled in the art that the principles of the present disclosure are not limited to such a specific example. In particular, the disclosed configuration can generally be applied to systems in which it is necessary to control a device and at the same time transmit television and/or internet signals with different devices, also having to be remotely powered.

Furthermore, reference has been made in the present disclosure to a PoE coupling unit. As will be apparent to the person skilled in the art, such a PoE coupling unit can be supplied externally to the external media converter and to the 5G FWA receiver and the same unit can power both the 5G FWA receiver and the media converter. Alternatively, there can be multiple PoE coupling units, for example a first unit at the 5G FWA receiver and a second unit at the external media converter. Still alternatively, the function of the PoE coupling unit can be integrated in the 5G FWA receiver or the external media converter or can be incorporated into both.

Furthermore, the above-described examples examine the specific case of two values of control voltage and correspondingly the case of two values of supply voltage. However, the present disclosure is not limited to this specific example. For example, a number n (with an internal number n greater than two) of values of control voltage can be converted by the conversion means 11 into as many values of supply voltage. Multiple values of control voltage and correspondingly multiple values of supply voltage can be convenient for managing and controlling the LNB 30 using additional commands included in the DiSEqC™ specification.

Furthermore, in the example presented, the first voltage PW1 has the value of 12V and the second voltage PW2 the value of 55V. However, the present disclosure is not limited to this particular example as different voltage values are possible. In fact, and as can also be deduced from the previous description, PW1 can be a value comprised between 12 and 18V and PW2 can be a value comprised between 48 and 55 V. Furthermore, according to particular embodiments, for example in consideration of any regulatory constraints, it could be convenient to have voltage values not included in the indicated voltage ranges. According to other embodiments PW2 can be for example 60V and PW1 can be for example 13V or a different voltage value suitable for the type of media converter used.

Furthermore, in the example presented, the conversion means 11 obtains the supply voltage through a static association. However, the present disclosure is not limited to the example provided. In fact, the conversion means 11 can obtain the supply voltage, for example by means of a linear resizing. For example, the supply voltage can correspond to the control voltage from/to which a fixed voltage value is subtracted or added. Still alternatively, the supply voltage can be a generic function of the control voltage, advantageously such a function can be one-to-one. Such a function and such linear resizing can be stored in the storage means 14.

Furthermore, in the example presented, the filtering device includes three bandpass filters. As is clear to the person skilled in the art, the number of filters, and especially of bandpass filters depends on the services offered. For example, if digital terrestrial service is not provided to the user, the filtering device could include two bandpass filters and a low pass filter. Alternatively, if the user is provided with four different services, the filtering device could include four bandpass filters and a low pass filter.

Furthermore, in the example presented, reference was made to the 802.3at standard. As is clear to the person skilled in the art, other standards for managing the ethernet interface are also possible and a further example is the 802.3bt standard.

For simplicity of presentation, reference was made to DiSEqC™ 1.0 and 2.0. However, it is understood that different versions with respect to those explicitly mentioned can also be used. Further examples are DiSEqC™ 1.1 and 1.2 or DiSEqC™ 2.1, 2.2 and 2.3.

It will also be apparent to the person skilled in the art that the present disclosure can also be implemented using configurations other than those explicitly described. For example, FIG. 6 shows that the injector 9a and the extractor 9b are separate units respectively from the first filtering device 50 and the second filtering device 150. However, the present disclosure comprises configurations in which the injector 9a and the extractor 9b are respectively associated with the first filtering device 50 and the second filtering device 150 as also shown in FIG. 9.

Further Examples of the Present Disclosure

According to further examples, the present disclosure comprises:

E1. A system for powering a second device (rooftop or outdoor device) through a coaxial cable connecting a first device (indoor device) with a second device, the coaxial cable configured to transmit a first data signal containing data exchanged between the first device and the second device, the coaxial cable comprising a first distal part and a second distal part arranged on opposite sides along the extension of the cable and respectively near the first device and the second device, the system comprising:
  an injector configured to inject over said coaxial cable, at the first distal part, a first voltage signal at a predetermined voltage value suitable for powering the second device (such a voltage value can also be configurable)
  an extractor configured to extract, at the second distal part, the first voltage signal (the output signal is not necessarily the same, since there may be, for example, attenuations and perhaps even distortions) from the coaxial cable; in which the injector and the extractor are configured to respect a frequency decoupling over the cable between the first data signal and the second first voltage signal.

E2. The system of example E1, where the coaxial cable is configured to transmit a control signal containing data to control a third device arranged near the first distal portion, the control signal being comprised in a frequency band less than 2 Mhz; where the injector and the extractor are configured to respect a frequency decoupling over the cable between the control signal and the first voltage signal.

E3. The system of example E2, including a switching device (also referred to as a tone switch) arranged between the third device (also referred to as a dish) and the extractor and configured to receive the first voltage signal in input and provide the third device with a second voltage signal having a voltage value dependent on the voltage value of the first voltage signal and different from said voltage value of the first voltage signal.

E4. The system of one of the preceding examples, where the coaxial cable is configured to transmit a second data signal comprised in the 950 kHz to 2150 kHz frequency band; where the injector and the extractor are configured to respect a frequency decoupling over the cable between the second data signal and the first voltage signal.

E5. The system of one of the preceding examples, where the coaxial cable is configured to transmit a third data signal comprised in the 174 kHz to 790 kHz frequency band where the injector and the extractor are configured to respect a frequency decoupling over the cable between the third data signal and the first voltage signal.

E6. Power adapter for a system for powering a second device through a coaxial cable connecting the first device with a second device, the coaxial cable configured to transmit a first data signal containing data exchanged between the first device and the second device, the coaxial cable comprising a first distal portion and a second distal portion arranged on opposite sides along the extension of the cable and respectively near the first device and the second device, the power adapter comprising:
  an injector configured to inject on said coaxial cable, at the first distal part, a second voltage signal at a predetermined voltage value suitable for powering the second device,
  a coupler configured to respect a frequency decoupling over the cable between the first data signal and the second voltage signal.

E7. Power adapter for a system for powering a second device through a coaxial cable connecting the first device with a second device, the coaxial cable configured to transmit a first data signal containing data exchanged between the first device and the second device and to transmit a second voltage signal having a predetermined voltage value suitable for powering the second device, the coaxial cable comprising a first distal part and a second distal part arranged on opposite sides along the extension of the cable and respectively near the first device and the second device, the power adapter comprising:
an extractor configured to extract, at the second distal portion, the second voltage signal from the coaxial cable
a decoupler configured to respect a frequency decoupling over the cable between the first data signal and the second first voltage signal.

The invention claimed is:

1. A voltage conversion apparatus for converting from a control voltage to a supply voltage, wherein the supply voltage is designed to power, through a coaxial cable a data communication device, wherein the coaxial cable is suitable for transmitting said supply voltage and at least one data signal associated with said data communication device, the voltage conversion apparatus comprising:
conversion means configured to convert from a first value of the control voltage and from a second value of the control voltage to a first value of the supply voltage and, respectively, to a second value of the supply voltage, wherein said first value of the control voltage and said second value of the control voltage are values of the control voltage for controlling a device distinct (30) from the data communication device.

2. The apparatus according to claim 1, further comprising:
input means configured to receive said first value of the control voltage and said second value of the control voltage, preferably from a device for receiving and decoding satellite television signals,
output means configured to supply said first value of supply voltage and said second value of supply voltage to said coaxial cable at said first value of control voltage and, respectively, said second value of control voltage.

3. The apparatus according to claim 1, wherein the first value of the supply voltage and the second value of the supply voltage are comprised in a range of operating voltages of said data communication device.

4. The apparatus according to claim 3, wherein at least one of said first value of the control voltage and said second value of the control voltage is excluded from said range of operating voltages.

5. The apparatus according to claim 1, wherein the distinct device is configured to control a communication channel over the coaxial cable,
wherein the first value of control voltage and the second value of the control voltage are designed to control the distinct device, by controlling said communication channel of the distinct device, preferably opening or closing said communication channel over the coaxial cable.

6. The apparatus according to claim 3, wherein said range of operating voltages comprises a range of voltages for which the data communication device functions in a substantially independent manner and/or in a manner that is substantially uninfluential with respect to a voltage value comprised in said range.

7. A voltage conversion apparatus for converting from a supply voltage to a control voltage, wherein the supply voltage is supplied through a coaxial cable and is designed to power, through the coaxial cable, a data communication device, wherein the coaxial cable is suitable for transmitting said supply voltage and at least one data signal associated with said data communication device, the voltage conversion apparatus comprising:
conversion means configured to convert from a first value of the supply voltage and from a second value of the supply voltage to a first value of the control voltage and, respectively, to a second value of the control voltage, wherein said first value of the control voltage and said second value of control voltage are values of control voltage for controlling a device that is distinct from the data communication device.

8. The apparatus according to claim 7, further comprising
first output means for supplying said supply voltage to said data communication device, and
second output means for supplying said values of the control voltage to said device distinct from the data communication device.

9. The apparatus according to claim 7, wherein the first value of the supply voltage and the second value of the supply voltage are comprised in a range of operating voltages of said data communication device.

10. The apparatus according to claim 9, wherein at least one of said first value of the control voltage and said second value of the control voltage is excluded from said range of operating voltages.

11. The apparatus according to claim 7, wherein the distinct device is configured to control a communication channel over the coaxial cable,
wherein the first value of the control voltage and the second value of the control voltage are designed to control the distinct device, by controlling said communication channel of the distinct device (30), preferably opening or closing said communication channel over the coaxial cable.

12. The apparatus according to one of claim 9, wherein said range of operating voltages comprises a range of voltages for which the data communication device functions in a substantially independent manner and/or in a manner that is substantially uninfluential with respect to a voltage value comprised in said range.

13. A system comprising:
an internal apparatus comprising a voltage conversion apparatus for converting from a control voltage to a supply voltage, wherein the supply voltage is designed to power, through a coaxial cable, a data communication device, wherein the coaxial cable is suitable for transmitting said supply voltage and at least one data signal associated with said data communication device, the voltage conversion apparatus comprising:
conversion means configured to convert from a first value of the control voltage and from a second value of the control voltage to a first value of the supply voltage and, respectively, to a second value of the supply voltage, wherein said first value of the control voltage and said second value of the control voltage are values of the control voltage for controlling a device distinct from the data communication device;
an external apparatus comprising a second voltage conversion apparatus for converting from the supply voltage to the control voltage, wherein the supply voltage is supplied through the coaxial cable and is designed to power, through the coaxial cable, the data communication device, wherein the coaxial cable is suitable for transmitting said supply voltage and at least one data signal associated with said data communication device, the second voltage conversion apparatus comprising:

conversion means configured to convert from the first value of the supply voltage and from the second value of the supply voltage to the first value of the control voltage and, respectively, to the second value of the control voltage, wherein said first value of the control voltage and said second value of the control voltage are values of the control voltage for controlling the device that is distinct from the data communication device; and the coaxial cable connecting the external apparatus and the internal apparatus.

14. The system according to claim 13, further comprising first output means for supplying said supply voltage to said data communication device, and second output means for supplying said values of the control voltage to said device distinct from the data communication device, wherein the second output means of the external apparatus is configured to supply values of the control voltage that are substantially equal to the values of the control voltage received by the input means of the internal apparatus.

* * * * *